United States Patent [19]

Noble et al.

[11] Patent Number: 4,726,633

[45] Date of Patent: Feb. 23, 1988

[54] TILTABLE MONITOR

[75] Inventors: Lynn Noble, Boston; Richard Leitermann; James E. Kulp, both of Cambridge, all of Mass.

[73] Assignee: Symbolics Inc., Cambridge, Mass.

[21] Appl. No.: 840,801

[22] Filed: Mar. 18, 1986

[51] Int. Cl.[4] .............................................. A47B 81/06
[52] U.S. Cl. ..................... 312/7.2; 248/421; 248/664; 358/254
[58] Field of Search ................. 312/7.2; 248/1 I, 1 H, 248/1 F, 421, 422, 157, 664; D14/80, 81; 297/366, 367, 368, 369; 358/254

[56] References Cited

U.S. PATENT DOCUMENTS

| D. 183,780 | 10/1958 | Whipple | 312/7.2 X |
|---|---|---|---|
| 2,499,579 | 3/1950 | Fritsch | 312/7.2 X |
| 3,641,838 | 2/1972 | Turner | 297/369 X |
| 3,784,135 | 1/1974 | Owen, Jr. | 248/1 I |
| 3,789,140 | 1/1974 | McQueen et al. | 248/1 I |
| 4,087,885 | 5/1978 | Gillentine | 297/367 X |
| 4,092,009 | 5/1978 | Koutsky | 248/421 |
| 4,427,243 | 1/1984 | Miller | 312/319 X |
| 4,447,031 | 5/1984 | Souder, Jr. et al. | 248/1 F |
| 4,471,931 | 9/1984 | Covey et al. | 248/1 I |

FOREIGN PATENT DOCUMENTS

| 58242 | 8/1982 | European Pat. Off. | 312/7.2 |
|---|---|---|---|
| 2940493 | 4/1981 | Fed. Rep. of Germany | 358/254 |
| 581916 | 9/1958 | Italy | 312/7.2 |

*Primary Examiner*—Kenneth J. Dorner
*Assistant Examiner*—Thomas A. Rendos
*Attorney, Agent, or Firm*—Sprung Horn Kramer & Woods

[57] ABSTRACT

A computer monitor is provided with a chassis including a base, a rear support fixed to the base and extending vertically upwardly therefrom, and a front support connected to a cathode-ray tube. The front support and the cathode-ray tube are mounted above the base and spaced apart therefrom for pivotal movement of the front support and cathode-ray tube relative to the base and rear support about a pivot axis disposed at the upper front portion of the monitor. The monitor can be releasably maintained in any one of a plurality of angular positions. The monitor housing comprises a first section surrounding the base and rear support and a second section completely detached from the first section and surrounding the front support.

4 Claims, 6 Drawing Figures

TILTABLE MONITOR

BACKGROUND OF THE INVENTION

The present invention relates to a computer monitor or console, wherein the monitor is adaptable to tilt during use in order to enable the user to comfortably view the display face thereof.

In the use of computers with cathode-ray tube monitors, it is frequently desirable to have the ability to adjust the position of the display face or display screen of the monitor in order to improve the visibility of the screen by a user. One way in which this is carried out, is by enabling the monitor to tilt.

Conventionally, the typical monitor is mounted on a support base, often sold separately from the monitor, and the base has the ability to tilt the support surface thereof, so that the monitor being supported thereon is also tilted.

In other tiltable monitors, the entire cathode-ray tube and housing surrounding the chassis in which it is mounted is disposed on a base and can slide along a base surface relative to the base in order to obtain tilting.

SUMMARY OF THE INVENTION

The main object of the present invention is to provide a new and improved mechanism for tilting a monitor display face and to provide a new and improved construction for the monitor incorporating the tilting mechanism.

These and other objects of the present invention are achieved in accordance with the present invention by a computer monitor having a chassis which comprises a base, rear support means fixed to the base and extending vertically upwardly therefrom, and front support means connected to a cathode-ray tube. The front support means and the cathode-ray tube are mounted above the base and spaced apart therefrom for pivotal movement of the cathode-ray tube relative to the base and the rear support means about a pivot axis which is disposed at the upper front portion of the monitor.

The housing preferably comprises a first section surrounding the base and rear support means, and a second section which is completely detached from the first section and surrounds the front support means. In this way, the monitor has a split housing, with the second section of the housing appearing to float over the base and with respect to the rear portion of the housing.

The pivotal mounting means permits angular displacement of the display face of the cathode-ray tube from a vertical position to a forward extreme position of about 13.5° and a rearward extreme position of about 3.5°. The pivotal mounting means also includes means for releasably retaining the cathode-ray tube in any one of a plurality of positions between the forward and rearward extreme positions.

The cathode-ray tube is conveniently and easily retained in any desired angular displacement position by means of an easily accessible, manually actuatable handle, which extends rearwardly from the second section of the housing to a position between the first and second sections, so that the handle can be gripped by one facing the display face of the monitor and pulled towards the display face to release the retaining mechanism and enable the pivoting of the display to the desired position, whereupon the handle is released and the releasable retaining means retains the display face in the desired location.

These and other features and advantages of the present invention will be seen in more detail from the following detailed description of the invention, taken with the attached drawings, wherein:

DETAILED DESCRIPTION OF THE INVENTION

Figure 1:
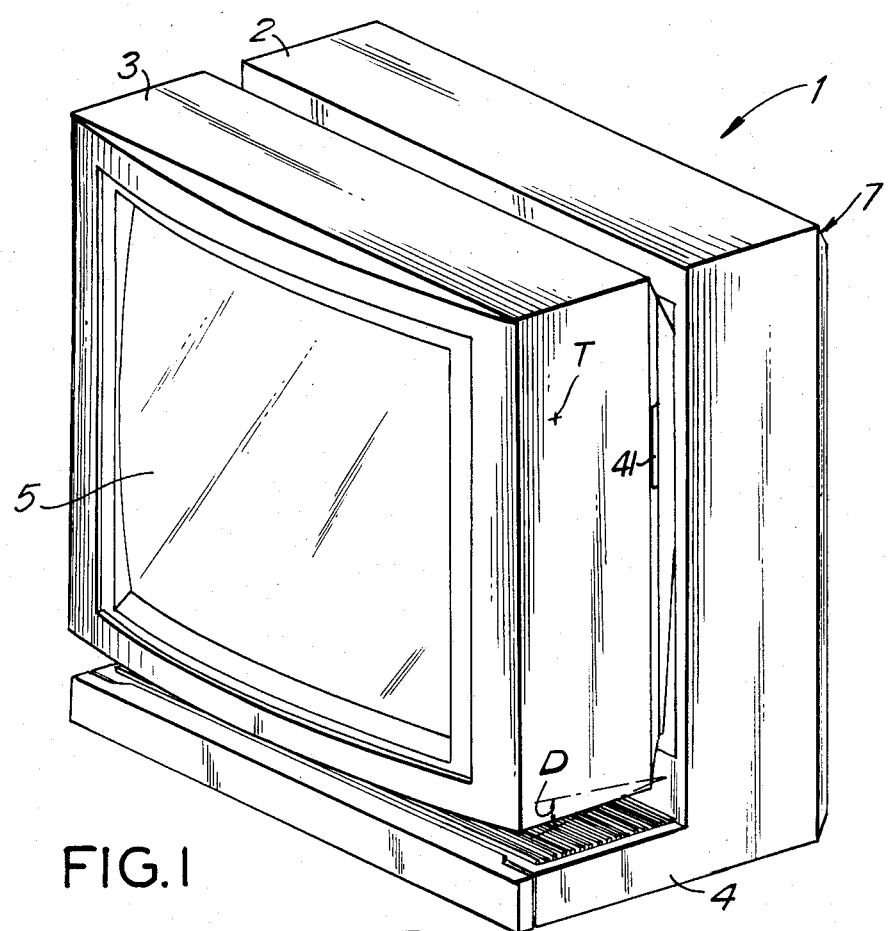
FIG. 1 is a perspective view of the monitor in accordance with the present invention.
Figure 2:
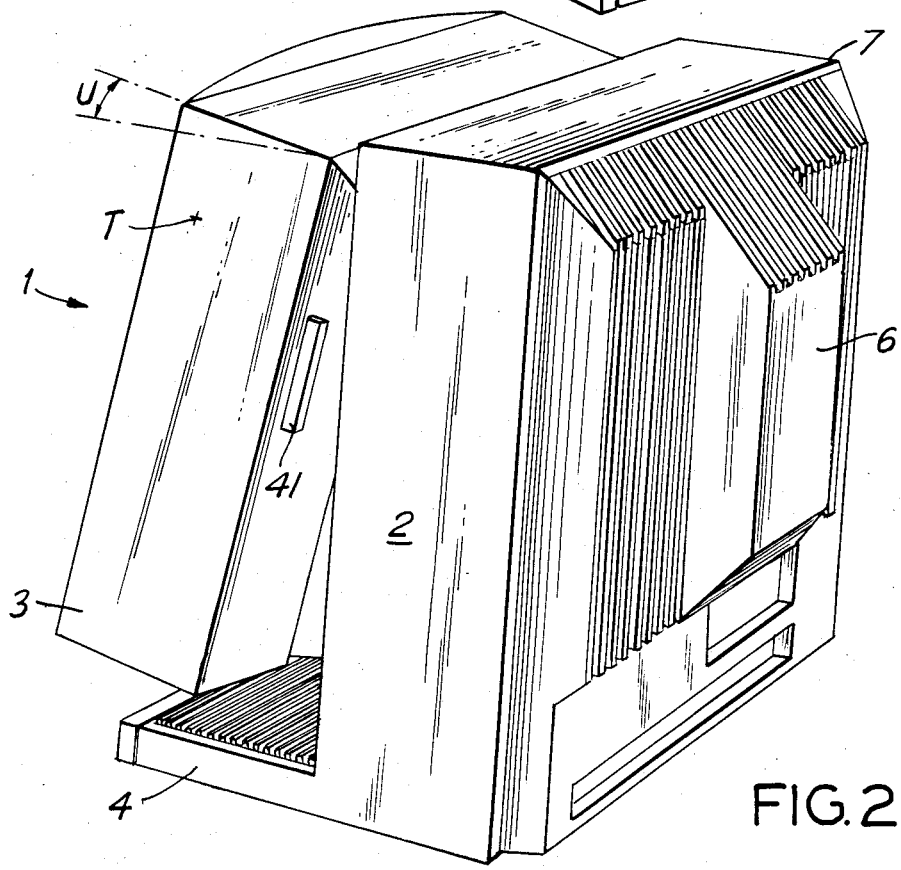
FIG. 2 is a side perspective view of the monitor of FIG. 1, with the display face tilted upwardly to its extreme upward position.
Figure 3:
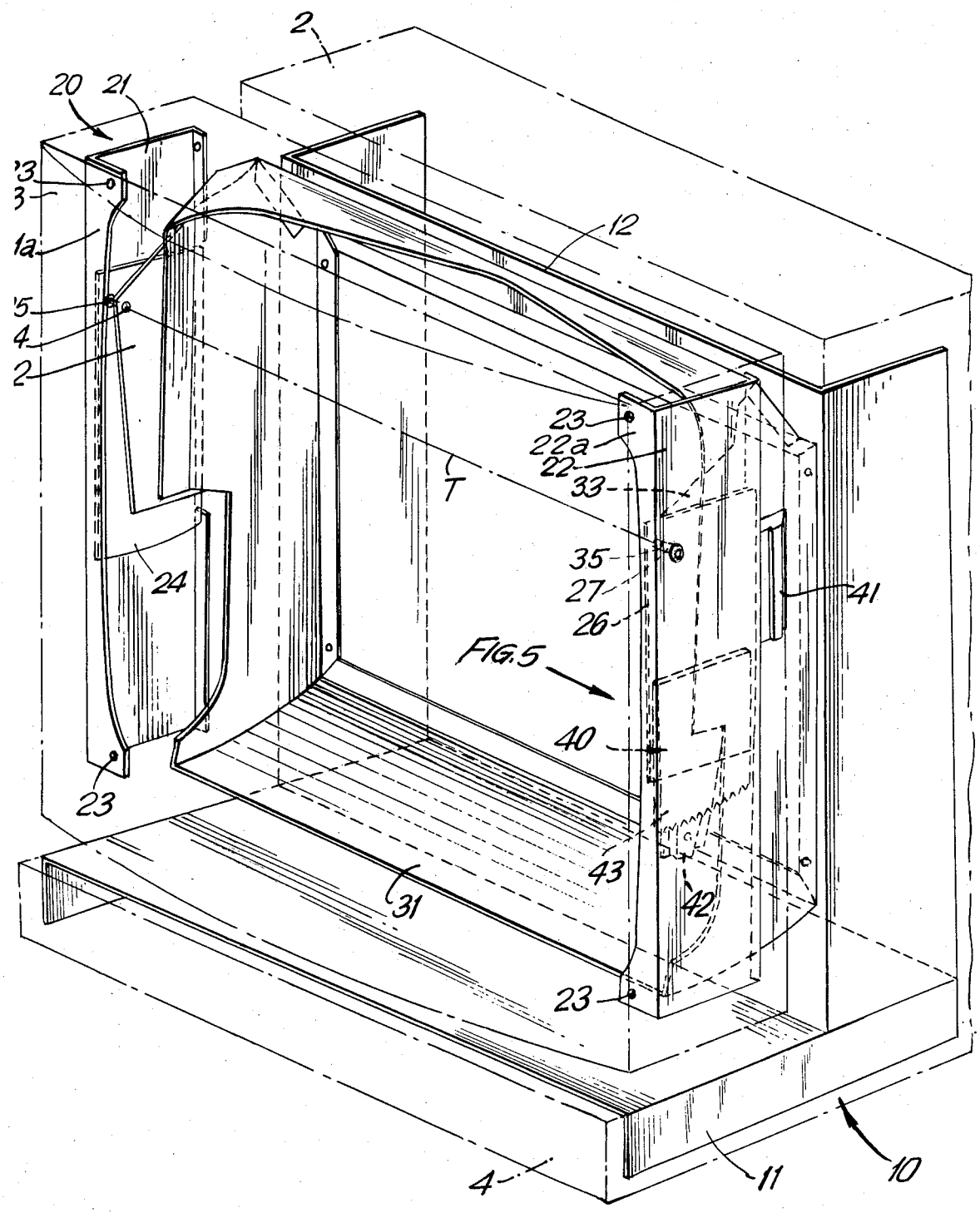
FIG. 3 shows the chassis within the housing of the monitor shown in FIG. 1.

Referring now to FIGS. 1-3, the computer monitor 1 in accordance with the invention includes a chassis 10 including a base 11, a rear support 12 fixed to the base and extending vertically upwardly therefrom, and front support means 20 including support members 21, 22 having front flanged portions 21a, 22a, respectively, which include mounting holes 23 therein to which the frame of the cathode-ray tube 5 is screwed into place by screws (not shown).

The front support means 20 is mounted to the rear support 12 by pivotal mounting means including support frame 31, which has arms 32 and 33 extending forwardly therefrom and bearing pivot pins 34, 35 thereon. Support members 21 and 22 have plates 24, 26 mounted thereon, and between members 21 and 24 and members 22 and 26 are disposed bushings 25, 27, respectively, which receive the pivot pins 34, 35 to define a pivot axis T for the support members 21, 22 and thereby the cathode-ray tube 5 which is fixedly mounted thereto.

The monitor also includes means 40 for releasably retaining the support members 21 and therefore the cathode-ray tube 5 in any one of a plurality of desired angular positions around the pivot axis T. The means 40 will be discussed in more detail with regard to FIG. 4-6.

The housing of the monitor includes a first section 7 having a portion 2 covering the rear support 12, and a portion 4 covering the base 11. The housing also includes a second section 3 which is completely detached from the first section 7 and which surrounds the front support means 20. The second section 3 of the housing is disposed above the base and spaced apart therefrom to provide clearance for the tilting movement.

As a result of the mounting of the cathode-ray tube 5 above the base 4 and spaced apart therefrom, and for pivoting movement about pivot axis T, the cathode-ray tube 5 can pivot forwardly and therefore upwardly from the rest position shown in FIG. 1, wherein it is generally vertical, to the forward extreme position shown in FIG. 2, having an angular displacement U of about 13.5°. The cathode-ray tube 5 can also pivot rearwardly and therefore downwardly by an angle D of up to 3.5°.

As a result of forming the housing in the two sections 3 and 7, as shown in FIG. 1 and FIG. 2, the cathode-ray tube 5 has the appearance of floating with respect to the base 4 and rear section 2. The cylindrical portion of the cathode-ray tube 5, which extends rearwardly of the front thereof, is housed in portion 6 of upright portion 2 and is able to move therein when the cathode-ray tube 5 is pivoted between its extreme positions.

Figure 4:
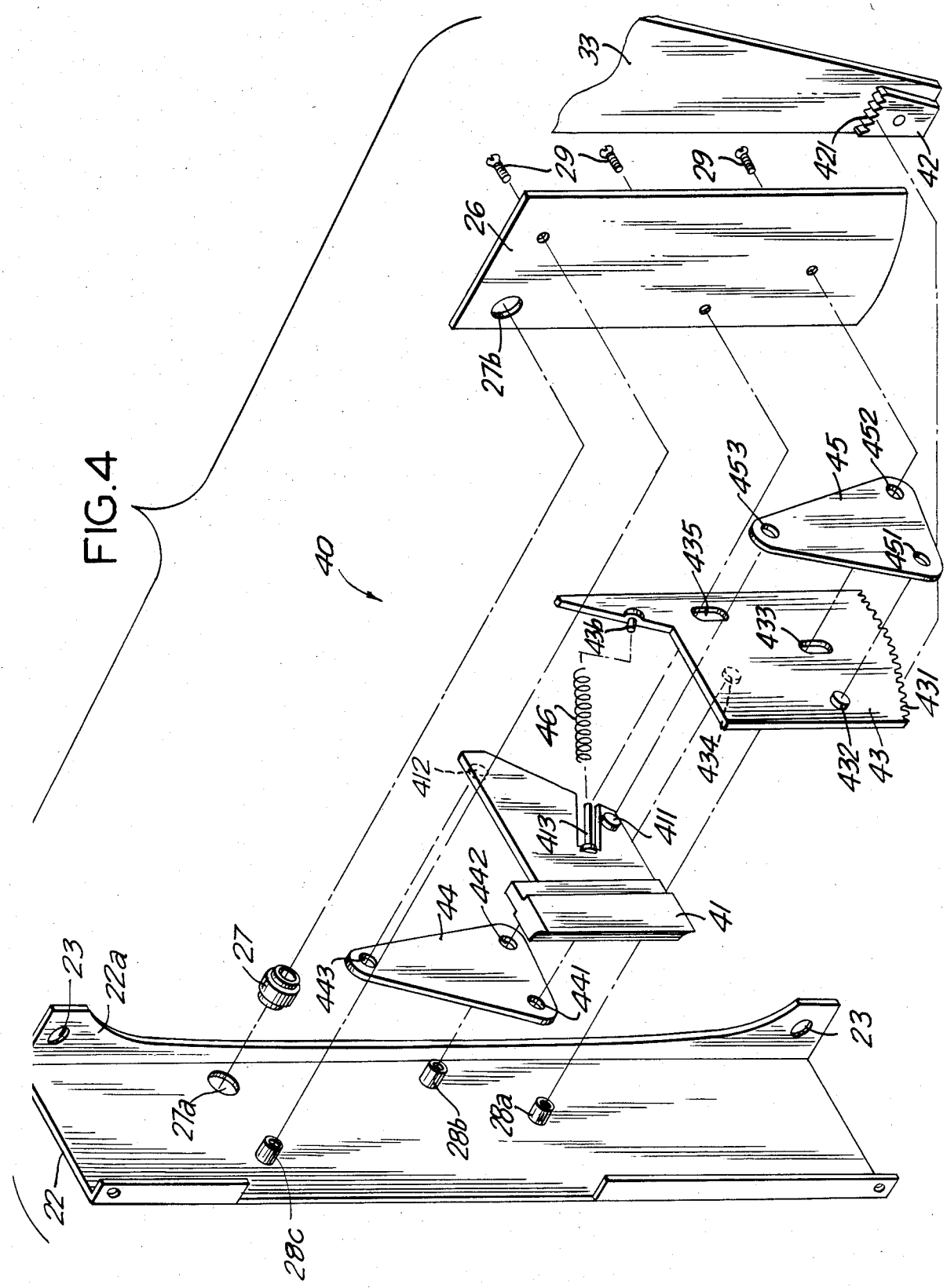
FIG. 4 is an exploded view of the tilt position retaining mechanism shown in FIG. 3.
Figure 5:
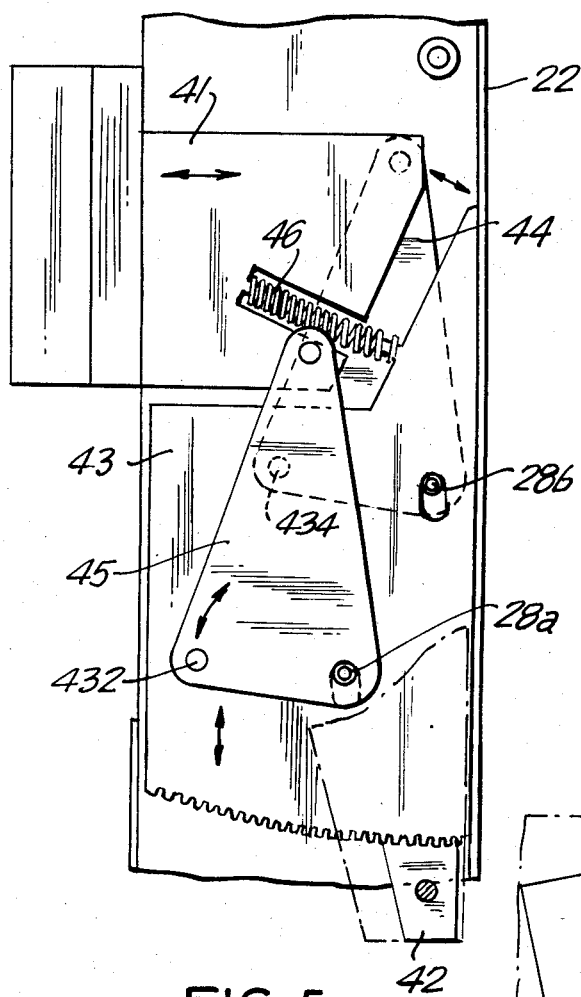
FIGS. 5 and 6 show the mechanism of FIG. 4 in the locking and unlocking positions, respectively.
Figure 6:
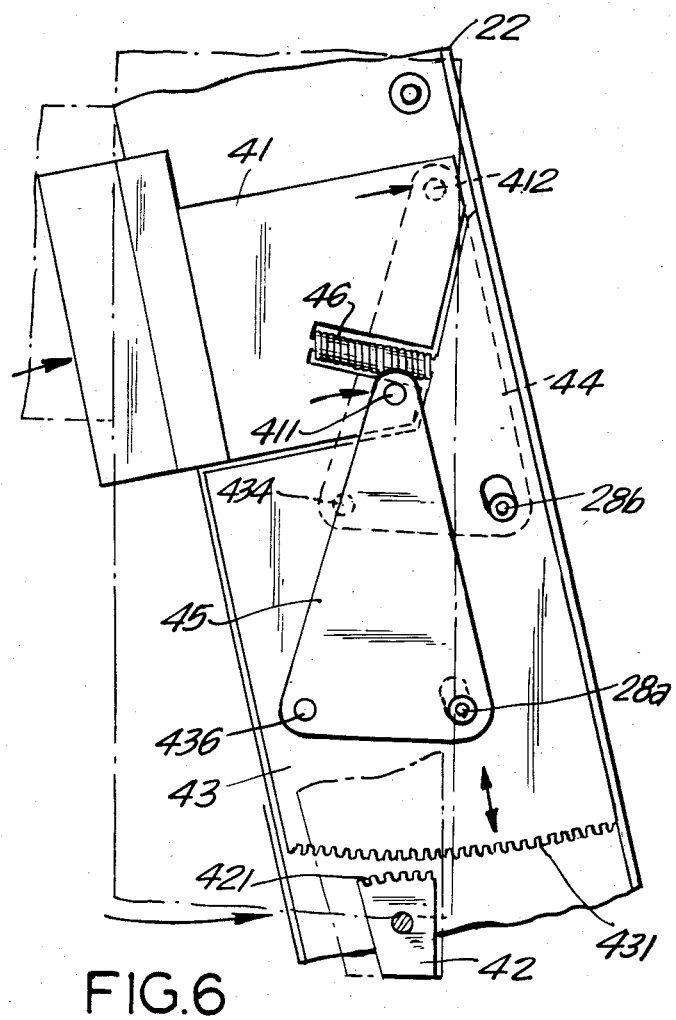

Now referring to FIGS. 4–6, the means for releasably retaining the cathode-ray tube 5 in one of a plurality of positions is shown in more detail.

The means 40 is for the most part mounted between members 22 and 26, which are spaced apart by spacers 28a, 28b and 28c, and are joined together by screws 29. Bushing 27 is also held between plates 22 and 26 and is mounted in bores 27a and 27b.

Spacers 28a and 28b also serve as fixed pivot points for the means 40, as will be explained.

Means 40 includes a first toothed member 42 mounted on arm 33 of support frame 31 and has a toothed portion 421.

First toothed member 42 is engaged by second toothed member 43, and specifically by teeth 431, which are disposed along an arcuate path as shown. The path is preferably a section of a circle having its radius at the pivot axis T. Second toothed member 43 also includes two pivot pins 432 and 434, two slots 433 and 435 and a spring retaining pin 436 for holding one end of spring 46.

A handle member 41 is provided, which actuates the means 40 to engage and disengage teeth 431 and 421, as will be explained hereinafter. Member 41 also includes pivot pins 411 and 412 and pin 413 for holding the other end of spring 46.

Linkage elements 44 and 45 are also provided and have pivot holes 441, 442, 443 and 451, 452 and 453, respectively.

When mounted together, spacer 28a passes through slot 433 and pivot bore 452, and spacer 28b passes through pivot bore 442 and slot 435. Pivot pin 412 is received in pivot hole 443, pivot pin 434 is received in pivot hole 441, pivot pin 411 is received in pivot hole 453, and pivot pin 432 is received in pivot hole 451.

One function of spring 46 is to load all of the members of means 40 in a way which always removes play and prevents rattling whether the means 40 is in an engaged or disengaged state.

The means 40 operates as follows. In the normal rest position shown in FIG. 5, spring 46 exerts a force urging members 41 and 43 away from each other. Linkage elements 44 and 45, which pivot about spacers 28b and 28a, respectively, are thereby urged counter-clockwise to the position shown in FIG. 5, wherein they both exert a downward force on toothed member 43 by means of their action on pivot pins 432 and 434.

As handle 41 is pushed inwardly by the user, as shown in FIG. 6, spring 46 is compressed. Simultaneously, linkage elements 44 and 45 are pivoted clockwise around spacers 28b and 28a as a result of the action of pivot pins 412 and 411. This clockwise pivoting of linkage elements 44 and 45 simultaneously causes pivot holes 441 and 451 to force upwardly and move pivot pins 434 and 432 upwardly to cause a lifting of the toothed member 43 relative to toothed member 42. The path of member 43 is defined and limited by linkage elements 44 and 45 and a first "four-bar linkage" created between the spacers 28a, 28b, elements 44, 45 and pivot pins 432, 434. Similarly, the path of handle 41 is defined and limited by a second "four-bar linkage" between elements 44, 45, pivot pins 411, 412 and spacers 28a, 28b.

As shown in FIG. 6, once teeth 431 and 421 are disengaged, support member 22 can now be angularly displaced relative to toothed member 42 until a desired angular position for the display is obtained. At this time, the handle 41 is released and teeth 431 again engage teeth 421, as shown in FIG. 5, and retain the display in the desired position.

A variation of the present invention may include friction surfaces instead of gear teeth 421, 431 in order to provide infinite control over the angle of the display face of the monitor.

It will be appreciated that the instant specification and claims are set forth by way of illustration and not limitation, and that various modifications and changes may be made without departing from the spirit and scope of the present invention.

What is claimed is:

1. In a computer monitor having a cathode-ray tube with a display face, a chassis mounting the cathode-ray tube with the display face at the front of the monitor and a housing surrounding the chassis, the improvement wherein the chassis comprises a front chassis section having a front portion corresponding to the front of the monitor and a rear portion and to which the cathode-ray tube is secured to dispose the display face at the front portion, a rear chassis section behind the front section, a base disposed below the front and rear chassis sections and secured to the rear chassis section, means connecting the front chassis section to the rear chassis section and spaced above the base for free pivotable movement of the front chassis section relative to the base and rear chassis section about a pivot axis disposed at the upper front portion of the front chassis section, and manually actuatable means movable between a rest position, wherein the front chassis section is releasably retained in a desired pivot position, and a actuated position, wherein the front chassis is free to pivot around its pivot axis, wherein the manually actuatable means comprises a handle, means mounting the handle on one side of the front chassis section at the rear portion thereof for sliding movement towards the front portion of the front chassis section to move the manually actuatable means into the actuated position, a first locking member fixed to the rear chasis section, a second locking member and means mounting the second locking member on the front chassis section for sliding movement in a direction perpendicular to the movement of the handle and in response to the movement of the handle towards the front portion of the front chassis section from a first position, wherein the second locking member engages the first locking member, to a second position, wherein the second locking member is spaced apart from the first locking member.

2. The computer monitor according to claim 1, wherein the handle is disposed at the upper portion of the front chassis section.

3. The monitor according to claim 1, wherein the connecting means comprises two aligned pivot pins on sides of the rear chassis section and forming said pivot axis, a bushing on sides of the front chassis section receiving the pivot pin, and wherein the first locking member comprises a first toothed member, the second locking member comprises a second toothed member engageable with the first toothed member.

4. The monitor according to claim 1, wherein teeth of the second toothed member are disposed along an arcuate path to engage teeth of the first toothed member in any on of a plurality of relative positions.

* * * * *

UNITED STATES PATENT AND TRADEMARK OFFICE
CERTIFICATE OF CORRECTION

PATENT NO. : 4,726,633
DATED : Feb. 23, 1988
INVENTOR(S) : Noble et al.

It is certified that error appears in the above-identified patent and that said Letters Patent is hereby corrected as shown below:

Sheet 2 of Drawings, left side column of numbers — Delete "3" in first instance, "1a", "5", "4", and "2" and substitute --23--, --21a--, --25--, --34-- and --32-- therefor Signed and Sealed this Sixth Day of September, 1988

Attest:

DONALD J. QUIGG

Attesting Officer

Commissioner of Patents and Trademarks